(No Model.)
F. L. O. WADSWORTH.
TELEMETER.
No. 536,494. Patented Mar. 26, 1895.
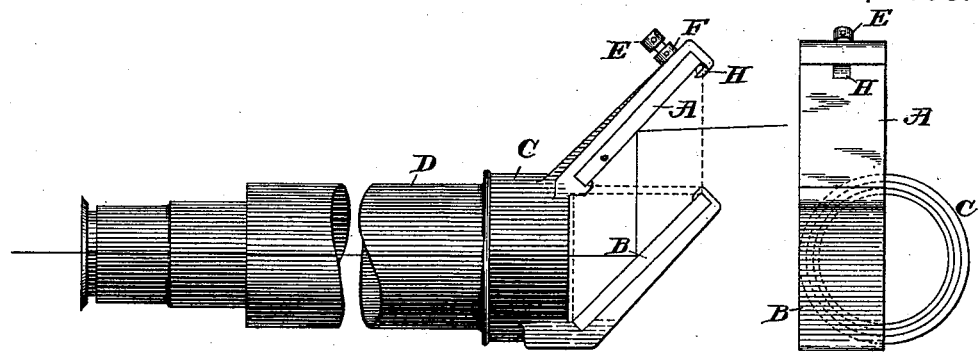
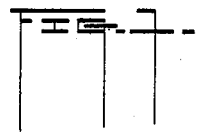
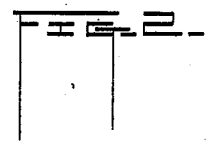
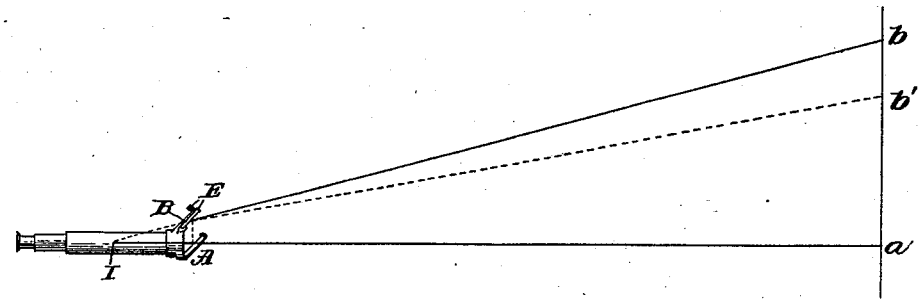
FIG. 3.
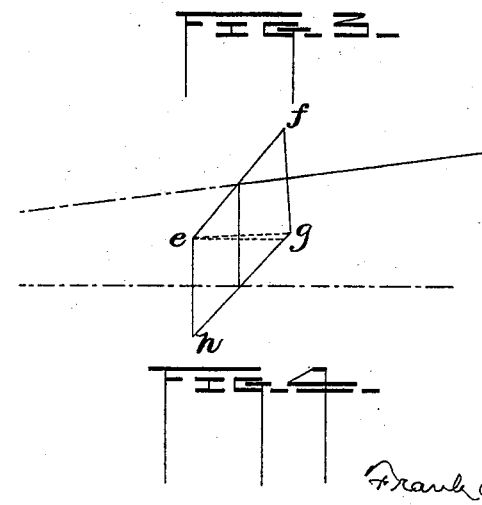
FIG. 4.
WITNESSES:
C. W. Smith
P. L. Clark
INVENTOR,
Frank L. O. Wadsworth
BY
ATTORNEY.

UNITED STATES PATENT OFFICE.

FRANK L. O. WADSWORTH, OF WELLINGTON, OHIO.

TELEMETER.

SPECIFICATION forming part of Letters Patent No. 536,494, dated March 26, 1895.

Application filed June 7, 1894. Serial No. 513,823. (No model.)

*To all whom it may concern:*

Be it known that I, FRANK L. O. WADSWORTH, a citizen of the United States, residing at Wellington, in the county of Lorain and State of Ohio, have invented certain new and useful Improvements in Telemeters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to telemeters, and the object of my invention is to provide an improved attachment to an ordinary telescope by means of which the distance between it and a distant object can be easily, rapidly and accurately determined. The method by which this is done is in brief the determination of the linear distance subtended by a fixed angle whose vertex is at the observers' station. This fixed angle has been determined in previous forms either by the use of fixed cross wires in the focal field of the observing telescope (stadia wire method) or by placing in front of the telescope and covering one-half the field of the latter, a refracting prism which bends the rays passing through it by a certain amount depending on the angle of the prism, as in a certain well-known patentable instrument. The objection to the first of these forms is that the telescope requires to be firmly mounted on a tripod or otherwise, while the reading is being made: and that it is difficult to read accurately the points of intersection of wires on the rod at great distance. The objections to the second form is, that while it dispenses with the use of a tripod or support for the observing telescope, and likewise increases the accuracy by making the measurement depend upon the observance of a single coincidence of two images, it requires the introduction of a refracting prism into the optical path of the rays which form one of the images in the observing telescope.

It is well known that when an object is viewed through such a prism, the image of the object is surrounded by a fringe of colored light on account of the difference in refractive power of the prism for different kinds of light; and the sharpness of definition is thereby lost, rendering the accurate setting of any part of the refracted image into coincidence either with the cross wire or with the direct image (which is formed by the rays which pass through the uncovered half of the objective) very difficult; and, if the prism has a large refracting angle, impossible.

The accuracy of the measurement would, other things being equal, increase with an increase of the fixed angle of measurement; but in order to increase this angle, I must with the aforesaid patented form of instrument increase correspondingly the refracting angle of the prism; and this as already pointed out increases the indistinctness of the image, and more than negatives the increase of accuracy which would otherwise result. The only possible method of obviating this indistinctness in the case of a refracting prism is to make it achromatic, viz: to make a compound prism of two kinds of glass similar to the compound achromatic telescope objective, and this very considerably increases its cost. To avoid all these and other difficulties as well as to obtain certain advantages not possessed by the patented form of instrument, I use instead of a prism covering one-half the field, a combination of two reflecting surfaces which are fixed at a certain small and predetermined angle to one another. This combination is placed in front of the telescope in such a way as to cover one half the field of the latter; and so that in addition to the image of the object, at which the telescope may be directed, as seen directly through the uncovered half, there is another image of the same object seen after a double reflection from the two reflecting surfaces, displaced with reference to the first by an angular amount which is double the angle between the aforesaid two reflecting surfaces.

The use of this system has four distinct advantages over the use of a refracting prism.

First. The first cost is less than that of an achromatic refracting prism which is necessary if good definition is to be obtained.

Second. As the rays of light which pass the combination have suffered no refraction, but only reflection, the resulting image is not colored in the least, no matter how great the angle between the two reflecting surfaces may be. Consequently any fixed angle of measurement may be used without prejudicing the accuracy of the result by causing indistinctness in the displaced image.

Third. The angle between the reflecting surfaces may be adjusted so as to make the same combination useful for either very great or for very small distances, while with the prism there is no method by which the refracting angle and therefore the angular displacement of the refracted image may be changed, and I must therefore, if the best results are to be obtained, have a set of prisms of different angles, one for short, another for medium, and a third for long distances, which still further increases the expense.

Fourth. By a suitable disposition of the second reflecting surface, I can make the point from which the distance is measured, the center of the instrument instead of some point in front of the same, as in the case of the stadia wire method, or some point in the prism itself as in the patented form. This last point is of particular importance when the attachment is used in connection with transit instruments, in which the point of measurement is the center of the instrument.

In order to still more thoroughly explain my invention and emphasize the particular points of advantage above mentioned, I will now describe a particular form of attachment constructed in accordance therewith and shown in the accompanying drawings, in which—

Figure 1 is a side view of a telescope provided with this attachment, and Fig. 2 an end view of the same. Fig. 3 is a diagram showing the method of measurement and indicating how the fixed angle of measurement may be changd so as to make it anything desired. Fig. 4 shows a modified form in which the two reflecting surfaces are the two sides of a solid block of glass, and are therefore unchangeable with respect to each other.

A and B are the two reflectors (Fig. 1) which are secured in a frame C, which slips over the end of the telescope D in place of the usual cap. These reflectors are arranged to cover one half the field of the telescope on one side of a diameter as shown in the drawings, and are inclined at a small angle to one another so that the ray indicated by the dotted lines, which enters the telescope after double reflection is slightly inclined to the optical axis of the latter, this inclination determining the small fixed angle of measurement which is one of the factors in the determination of the distance. A screw E secured by a lock-nut F bears against the back surface of one of the mirrors A, the mirror being kept against the point of this screw by means of a spring or block of elastic material H. By turning this screw in one direction or the other the inclination of the reflected ray to the optical axis can be varied for the purpose hereinbefore described.

The method of using the instrument is as follows: The instrument is first adjusted or calibrated by placing it in position and measuring off a distance I $a$, Fig. 3—say one thousand feet. Then a rod $a\,b$ with two marks or targets at $a$ and $b$ (say ten feet apart) is placed at $a$, the telescope directed upon it, and the cap carrying the mirrors turned on the telescope until the edge of the mirror system is parallel to the length of the rod. Two images of the rod will be seen in the eye piece of the telescope, which will be in line with each other, but displaced laterally with reference to each other by an amount depending on the angle of inclination of the two surfaces A and B. This angle is then varied by means of the screw E until the upper mark or target of one image is in exact coincidence with the lower mark or target of the other image. Then the lock-nut F is screwed down locking the screw, and thus fixing the two mirrors with reference to each other. I then know the angle $x$ between the incident ray before reflection and the axis of the telescope, which in this case, is the angle $b\,I\,a$ whose tangent is ten one-thousandths equals one one-hundredth. Then any other distance is very readily determined by placing the rod at the point whose distance from the instrument is desired, and measuring the lateral separation of the two images in the telescope in any of the customary ways of determining such measurements as for instance by providing the rod with a scale graduation like a stadia rod, and noting what graduation on the rod in the displaced image coincides with the zero of graduation in the other image. Then if $s$ be the scale reading corresponding to such coincidence, the distance of the rod from the point I will be:

$$\text{distance} = \frac{s}{\text{tangent angle } b\,I\,a} \text{ in this case, } 100s.$$

It is evident that by making the vertical distance between the surface of the two mirrors such, that this distance is to the distance from the center of the telescope mounting as $a\,b : a\,I$: the point I will coincide with said center of instrument, rendering any correction to the measured distance unnecessary.

It is evident that I may make the angle $b\,I\,a$ anything I please by turning the screw in or out. For long distances, say one thousand to three thousand feet, it will be convenient to use a smaller angle than one to one hundred (for example $b'\,I\,a$) in order to avoid the necessity for a rod of very great length; while for short distances (one to five hundred feet) the accuracy will be considerably increased by making the angle larger, say one to fifty, or one to twenty-five even.

If great constancy of angle is desired under severe conditions of use I may secure it by making the two reflecting surfaces the two sides of a solid block of glass, Fig. 4. This has also the advantage of not requiring any silvering, since the surfaces $e\,f$, $g\,h$ are both faces of total reflection for rays entering through the faces $e\,h$, $g\,f$.

I may avoid the necessity of using silvered mirrors in the form shown in Fig. 1, by using instead of mirrors equivalent total reflecting prisms as indicated by the dotted lines.

What I claim as new, and desire to secure by Letters Patent, is—

1. The combination with a telescope, of a frame C adapted to slip over the objective end of the telescope, and capable of rotation thereon, a reflector A rigidly mounted on one side of said frame and inclined forward in front of the telescope, a second reflector B mounted on the other side of the frame, and also extending forward of the telescope, and means for adjusting the angle between the reflecting surfaces, said reflectors covering only one-half the field of the telescope, substantially as described.

2. The combination with a telescope, of two reflectors mounted thereon and facing each other in planes which intersect at a small angle, said reflectors covering one-half the field of the telescope and being separated by a vertical distance bearing the same ratio to their distance from the center of the telescope as the normal base line bears to its distance from said center, substantially as described.

In testimony whereof I affix my signature in presence of two witnesses.

FRANK L. O. WADSWORTH.

Witnesses:
GALES P. MOORE,
GEO. P. WHITTLESEY.